(12) United States Patent
Suzuki et al.

(10) Patent No.: US 7,782,374 B2
(45) Date of Patent: Aug. 24, 2010

(54) PROCESSOR AND PROCESSING METHOD FOR GENERATING A PANORAMIC IMAGE FOR A VEHICLE

(75) Inventors: Masayasu Suzuki, Kawasaki (JP); Ken Oizumi, Shibuya-ku (JP); Takeshi Akatsuka, Yokohama (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 1092 days.

(21) Appl. No.: 11/366,091

(22) Filed: Mar. 2, 2006

(65) Prior Publication Data

US 2006/0197761 A1    Sep. 7, 2006

(30) Foreign Application Priority Data

Mar. 3, 2005   (JP) ............................. 2005-058692

(51) Int. Cl.
| | |
|---|---|
| H04N 5/262 | (2006.01) |
| H04N 13/02 | (2006.01) |
| H04N 7/00 | (2006.01) |
| H04N 7/18 | (2006.01) |
| H04N 5/64 | (2006.01) |
| G06T 15/10 | (2006.01) |
| G06T 15/20 | (2006.01) |
| G05D 1/02 | (2006.01) |
| G06F 17/10 | (2006.01) |
| G06G 7/78 | (2006.01) |

(52) U.S. Cl. ........................... 348/239; 348/47; 348/48; 348/113; 348/159; 348/837; 345/427; 701/300

(58) Field of Classification Search .................. 348/36, 348/47, 48; 345/427
See application file for complete search history.

(56) References Cited

U.S. PATENT DOCUMENTS

| | | | | |
|---|---|---|---|---|
| 5,790,403 A | * | 8/1998 | Nakayama | ................... 701/28 |
| 6,111,702 A | * | 8/2000 | Nalwa | ......................... 359/725 |
| 6,373,518 B1 | | 4/2002 | Sogawa | |
| 6,393,163 B1 | * | 5/2002 | Burt et al. | ................... 382/294 |

(Continued)

FOREIGN PATENT DOCUMENTS

| | | |
|---|---|---|
| EP | 0 949 818 A2 | 10/1999 |
| EP | 1 094 668 A2 | 4/2001 |
| EP | 1 179 958 A1 | 2/2002 |
| JP | 09-159442 | 6/1997 |
| JP | 2004-64441 | 2/2004 |
| WO | 2005074287 A1 | 8/2005 |

OTHER PUBLICATIONS

Mircea Nicolescu et al., Electronic Pan-Tilt-Zoom: A Solution for Intelligent Room Systems,Integrated, Media Systems Center, Los Angeles, CA 2000 IEEE.

(Continued)

*Primary Examiner*—Lin Ye
*Assistant Examiner*—Chia-Wei A Chen
(74) *Attorney, Agent, or Firm*—Young Basile (57) ABSTRACT

An image processor is disclosed for a vehicle having a plurality of cameras and a monitor that displays a panoramic image derived from multiple images generated by the plurality of cameras. The processor includes input buffers for storing camera image data captured through respective camera modules and output buffer for storing a panoramic image. The camera image data for generating the panoramic image are retrieved from input buffers. The camera image data are stored in an output buffer using an reconfigured address conversion table. The reconfigured address conversion table is an address conversion table which is obtained by reconfiguring an address conversion table when camera modules are assumed to be free of vehicle installation errors. The reconfiguration is performed on the basis of parameters which are used to correct vehicle installation errors of camera modules.

25 Claims, 8 Drawing Sheets

U.S. PATENT DOCUMENTS

| | | |
|---|---|---|
| 6,928,194 B2 * | 8/2005 | Mai et al. .................... 382/284 |
| 6,944,395 B2 | 9/2005 | Hara |
| 7,098,914 B1 * | 8/2006 | Katayama et al. ........... 345/427 |
| 7,110,021 B2 | 9/2006 | Nobori et al. |
| 7,139,412 B2 * | 11/2006 | Kato et al. .................. 382/104 |
| 7,400,782 B2 * | 7/2008 | Zhou et al. .................. 382/284 |
| 7,499,079 B2 * | 3/2009 | Evans et al. ............. 348/218.1 |
| 2004/0100443 A1 | 5/2004 | Mandelbaum et al. |
| 2004/0133376 A1 | 7/2004 | Uffenkamp et al. |
| 2004/0183898 A1 * | 9/2004 | Endo et al. .................... 348/36 |
| 2004/0201587 A1 | 10/2004 | Mizusawa |
| 2004/0207831 A1 | 10/2004 | Aoyama |
| 2004/0260469 A1 | 12/2004 | Mizusawa |
| 2005/0265631 A1 * | 12/2005 | Mai et al. .................... 382/284 |

OTHER PUBLICATIONS

Ramin Shahidi et al., Implementation, Calibration and Accuracy Testing of an Image-Enhanced Endoscopy System; Dec. 12, 2002.
Juyang Weng, et al., Camera Calibration with Distortion models and Accuracy Evaluation, Oct. 1992.
European Patent Application No. 06253292.4 Extended Search Report dated Oct. 20, 2006.

* cited by examiner

PROCESSOR AND PROCESSING METHOD FOR GENERATING A PANORAMIC IMAGE FOR A VEHICLE

BACKGROUND

The present invention relates to the field of image processors and an image processing methods for vehicles and in particular to image processors that provide the driver of a vehicle with panoramic image obtained by applying perspective conversion to multiple images captured around the vehicle.

Japanese Laid-Open Patent Publication No. 2004-64441 discloses a type of vehicle image processor that changes the image data captured by cameras installed on the vehicle to a panoramic image data and displays the panoramic image on a monitor inside the vehicle.

For the vehicle image processor, the angle formed between the road surface and the angle or level of the camera installed on the vehicle body is detected as the pitch angle (deg) in the global coordinate system. On the basis of the pitch angle, an address conversion table is formed for converting the image data from cameras captured by the cameras into the panoramic image data. In the vehicle image processor, the pitch angle is computed inside the device, and the address conversion table is formed and stored. As a result, when needed, the image data from cameras can be converted into the panoramic image data for display on the monitor.

However, in the vehicle image processor, in order to make use of multiple cameras to capture the images in different directions around the vehicle and to display the panoramic image around the vehicle, it is necessary to replace each of the pixel data of multiple cameras by means of the address conversion table to form the panoramic image data. Then, in order to combine the multiple camera images to form an excellent panoramic image free of seams between images and without distortion, it is necessary to ensure complete agreement without any error in the actual attachment positions of cameras, installation directions and lens files. However, such errors inevitably take place for each vehicle in the camera installation operation.

At this point, as far as the errors for the vehicle image processor in the reference are concerned, although it is possible to correct the deviation and distortion of the panoramic image, the processing load on the vehicle image processor is nevertheless high in order to detect the installation errors of the cameras and recompute the address conversion table on the basis of the errors inside the device, so that it is necessary to use a computing device with a high processing power.

It would be desirable to provide a image processor and an image processing method for a vehicle characterized in which a panoramic image can be formed from multiple images with reduced processing.

SUMMARY

In accordance with one aspect of the invention, an image processor is provided for a vehicle having a plurality of cameras and a monitor that displays a panoramic image derived from multiple images generated by the plurality of cameras. The image processor includes input buffers adapted to receive and store image data generated by the plurality cameras; an output buffer adapted to store panoramic image data for display on a monitor; a reconfigured address conversion table that describes the relationship between the image data and panoramic image data, which reconfigured address conversion table is prepared by reconfiguring a non-reconfigured address conversion table to adjust for installation errors in the plurality of camera modules; and a controller adapted to read camera image data stored on the input buffers, translate the camera image data into a panoramic image data using the reconfigured address conversion table; and store the panoramic image data on the output buffer.

In accordance with another aspect of the invention, an image processing method is provided for use in a vehicle having a plurality of cameras and a monitor that displays a panoramic image derived from multiple images generated by the plurality of cameras. The method includes: storing camera image data captured by the cameras on an input buffer; providing an output buffer on which to store panoramic image data generated from the camera image data retrieved from the input buffer means and to output the panoramic image to the monitor; providing a non-reconfigured address conversion table that associates a plurality of input addresses in the input buffer with corresponding output memory addresses in the output buffer to form at least a portion of the panoramic image when the cameras are assumed to be free of installation errors; correcting the effect of installation errors in at least one of the plurality of cameras by shifting the input address associated with the corresponding output memory addresses in the non-reconfigured address conversion table to create a reconfigured address conversion table; and retrieving the camera image data from the input buffer and storing the camera image data in the output buffer according to the reconfigured address conversion table to generate the panoramic image.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
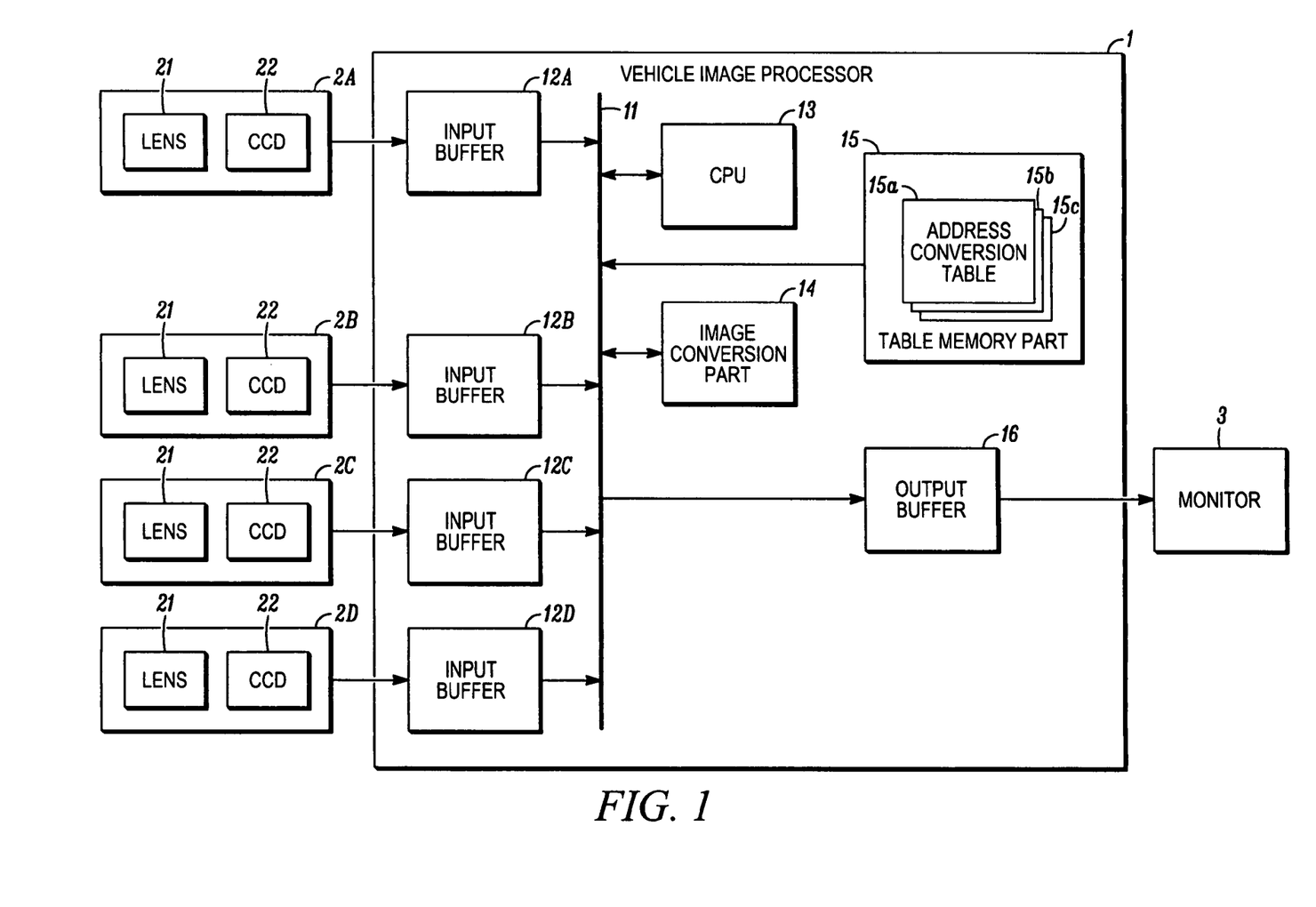
FIG. 1 is a block diagram showing the configuration of a vehicle image processor applied to the one embodiment of the present invention.
Figure 2:
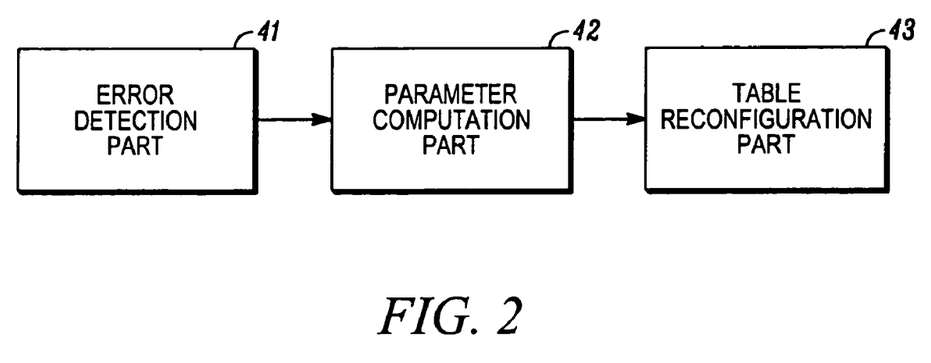
FIG. 2 is a block diagram showing the configuration for reconfiguring address conversion tables.

A vehicle image processor 1 in accordance with a first embodiment is shown in FIG. 1. In the case of the vehicle image processor 1, camera image data captured around the vehicle by camera modules 2A, 2B, 2C, and 2D are input to input buffers 12A, 12B, 12C, and 12D which correspond to respective camera modules 2A, 2B, 2C, and 2D; perspective conversion is applied by a CPU 13 and an image conversion part 14 using default or non-reconfigured tables stored in a table memory part 15 so as to generate a panoramic image around the vehicle; and data on the panoramic image are stored in an output buffer 16 and output to a monitor 3. The vehicle image processor 1 reconfigures or calibrates the default address conversion tables using function parts 41 through 43 as shown in FIG. 2, for example, so as to correct the effect of camera modules 2A, 2B, 2C, and 2D in order to display the panoramic image on monitor 3 with less distortion in the panoramic image or any deviation between respective images which constitute the panoramic image. The default or non-reconfigured address conversion tables provide address conversion information to generate a panoramic image based on the assumption that there a no installation errors in camera modules 2A, 2B, 2D and 2D.

Figure 3:
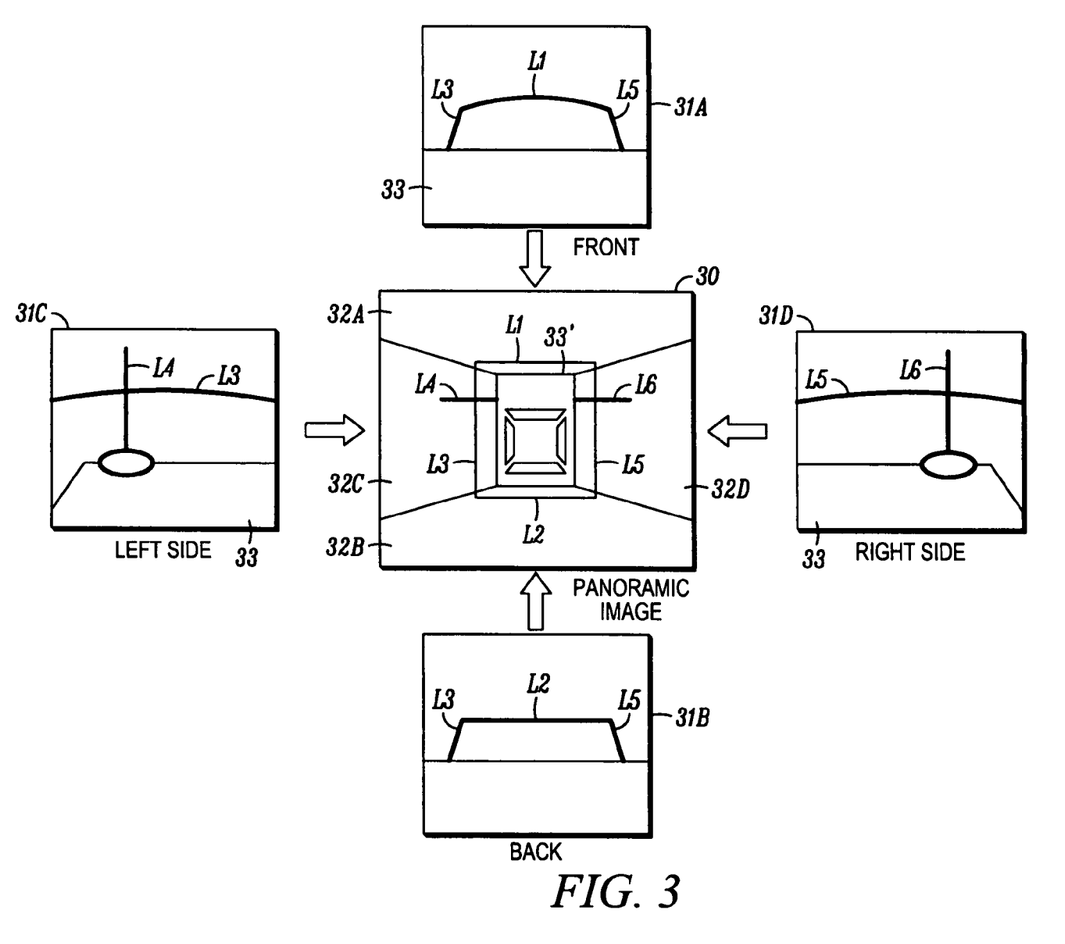
FIG. 3 is a diagram illustrating the process for generating a panoramic image through the application of perspective conversion to image data captured by cameras installed in different pickup directions.

More specifically, as shown in FIG. 3, a front camera image 31A is captured by camera module 2A, a rear camera image 31B is captured by camera module 2B, a left-side camera image 31C is captured by camera module 2C, and a right-side camera image 31D is captured by camera module 2D in order to generate a panoramic image 30 around the vehicle. Here, camera image 31A includes a vehicle body 33 and white lines L1, L3, and L5 which are drawn on the road surface; camera image 31B includes vehicle body 33 and white lines L2, L3, and L5; camera image 31C includes vehicle body 33 and white lines L3 and L4; and camera image 31D includes vehicle body 33 and white lines L5 and L6. Here, the white lines which appear in panoramic image 30 are drawn on the road surface and captured by camera modules 2A, 2B, 2C, and 2D for the purpose of illustrating distortion and deviation between the images which appear in the panoramic image.

In ideal conditions (that is, where camera modules 2A, 2B, 2C and 2D are assumed to have no errors in their installation positions), vehicle image processor 1 generates panoramic image 30 which is arranged around an automobile object 33' without any deviation between the constituent pixels of panoramic image 30 using a front image 32A, a rear image 32B, a left-side image 32C, and a right-side image 32D which are obtained by converting respective camera images 31A, 31B, 31C, and 31D, as seen from the top.

Figure 4:
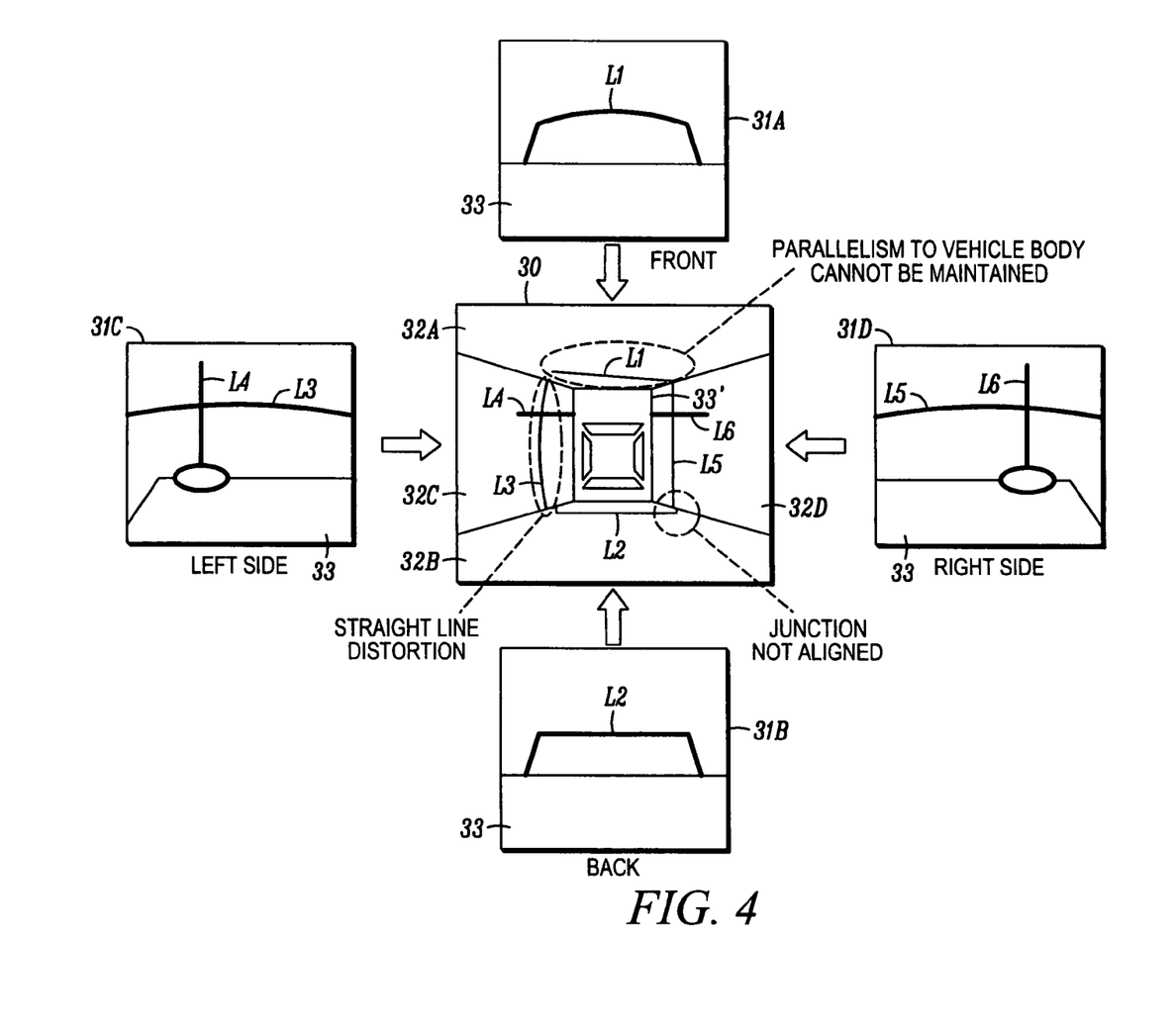
FIG. 4 is a diagram illustrating problems during processing for generating a panoramic image by applying perspective conversion to camera image data captured in different pickup directions when camera modules have installation errors.

On the other hand, if camera modules 2A, 2B, 2C, and 2D contain errors in their installation positions, as shown in FIG. 4, white line L1 in front image 32A results in a mismatch with automobile object 33' after the change of the perspective; white line L3 becomes distorted; or white lines L1, L2, and L3 are shifted to run across pixels 32A, 32B, and 32C which constitute panoramic image 30. However, in the case of vehicle image processor 1 explained below, processing is carried out so as to correct deviation and distortion in panoramic image 30 attributable to installation errors of the camera modules 2A, 2B, 2C, and 2D used to generate panoramic image 30, by which means the deviation and distortion in panoramic image 30 are suppressed, even when camera modules 2A, 2B, 2C, and 2D contain installation errors.

The configuration and operations for generating panoramic image 30 in which distortion and/or deviation is eliminated from respective camera images 31A, 31B, 31C, and 31D in the manner will be explained below.

A panoramic vehicle display system which includes the vehicle image processor 1 is configured by connecting four camera modules 2A, 2B, 2C, and 2D (hereinafter referred to as "camera modules 2" when referenced collectively) to vehicle image processor 1, as shown in FIG. 1. The vehicle image processor 1 takes the respective camera image data captured by camera modules 2A, 2B, 2C, and 2D as inputs and combines the respective camera image data so as to generate panoramic image 30 of the vehicle when viewed from above. In the present example, as described above, four camera modules 2A, 2B, 2C, and 2D aimed in the front, rear, right-side, and left-side directions are provided. Here, a case in which panoramic image 30 is generated when the vehicle is viewed above will be explained.

Respective camera modules 2A, 2B, 2C, and 2D are provided on different parts of the vehicle and are fixed with different pickup orientations. Each camera module 2 is configured with a pickup lens 21 and a CCD (charge-coupled device) 22. The camera modules 2 are NTSC (National Television System Committee) cameras and output image data in accordance with the NTSC format to vehicle image processor 1.

Vehicle image processor 1 is configured by connecting input buffers 12A, 12B, 12C, and 12D (hereinafter referred to as "input buffers 12" when they are referenced collectively) which are connected to respective camera modules 2A, 2B, 2C, and 2D; a CPU (Central Processing Unit) 13; image conversion part 14; table memory part 15; and output buffer 16 which is connected to monitor 3, via an internal bus 11.

Input buffers 12 are provided in the same number as camera modules 2. Input buffer 12A is connected to camera module 2A, input buffer 12B is connected to camera module 2B, input buffer 12C is connected to camera module 2C, and input buffer 12D is connected to camera module 2D. Input buffers 12 temporarily store the NTSC format camera image data, and the camera image data are read with image conversion timing of image conversion part 14 controlled by CPU 13.

Table memory part 15 stores address conversion tables 15a, 15b, 15c for respective image layouts to be presented to the driver. A case in which the four cameras' image data are combined to generate 1 panoramic image 30 will be explained in the present example. Here, assume that at least the address conversion tables for the image layouts used to generate panoramic image 30 from the respective camera image data stored in input buffers 12A, 12B, 12C, and 12D are stored in table memory part 15 for respective input buffers 12, that is, for respective camera modules 2.

The address conversion tables stored in the table memory part 15 are tables which contain camera numbers for distinguishing the address conversion tables from one another, memory addresses (input address information) of camera image data having greater address space resolution in the horizontal or the vertical direction than monitor 3, and memory addresses (output address information) of output buffer 16 used to display the panoramic image data with the resolution of monitor 3. That is, the address conversion tables describe the correspondence between the memory addresses in output buffer 16, that is, the display coordinates on monitor 3, and the coordinates (input addresses) of input buffers 12. This type of address conversion table is generated in advance based on the specifications, the positions, and the directions (optical axes) of camera modules 2A, 2B, 2C, and 2D. In addition, assume that the address conversion tables describe the correspondence between input addresses in input buffers 12 and output addresses in output buffer 16 for respective camera modules 2 (arbitrary camera numbers), and that they are provided in the same number as camera modules 2.

Image conversion part 14 reads the address conversion tables for respective camera modules 2 from table memory part 15 controlled by CPU 13, and stores camera image data which are read from input addresses designated by the address conversion tables to output addresses designated by the address conversion tables with reference to the tables. Here, because the address conversion tables contain the memory addresses in output buffer 16 according to the image layout, the panoramic image data which is replaced in output buffer 16 by image conversion part 14 is converted to have the same image layout as that of the address conversion table used. Furthermore, image conversion part 14 may be configured using an LSI (Large Scale Integrated Circuit), an FPGA (Field Programmable Gate Array), or a DSP (Digital Signal Processor), for example; or CPU 13 may be used for this purpose.

The address tables (described in more detail below) are reconfigured or calibrated to display panoramic image 30, for which installation errors (pitch angle, yaw angle, and roll angle) of respective camera modules 2 are corrected, during the shipment of the automobile. That is, the camera image data are read from input buffers 12 as a result of the perspective-conversion processing by image conversion part 14, and the address conversion tables are reconfigured or calibrated so as to suppress a distortion of the panoramic image data stored in output buffer 16 and deviations among the images which constitute panoramic image 30.

Output buffer 16 stores the panoramic image made up of the four image data whose perspective has been converted by image conversion part 14 and outputs it to monitor 3 as controlled by CPU 13.

Upon recognizing an image layout instruction or an image switching instruction from the driver by manipulation of a (not-shown) operation input part, CPU 13 determines which conversion tables are to be used for the image conversion by image conversion part 14. In addition, CPU 13 controls the timing for converting image data from input buffers 12 of image conversion part 14 and the timing for outputting data from output buffer 16 to monitor 3 so as to store panoramic image 30 continuously in output buffer 16 and switches panoramic image 30 displayed on monitor 3 continuously at the same time.

In addition, as shown in FIG. 2, CPU 13 is equipped with an error detection part 41 for error detection at the time of shipment of the automobile, a parameter computation part 42 for computing parameters used to correct the default address conversion tables, and a table reconfiguration part 43 for reconfiguring or calibrating the address conversion tables stored in table memory part 15. Furthermore, although a functional part for reconfiguring or calibrating the address conversion tables stored in table memory part 15, such as error detection part 41, parameter computation part 42, and table reconfiguration part 43, is provided within vehicle image processor 1 in the present example, address conversion tables externally configured may be stored in table memory part 15 also.

Error detection part 41 detects installation errors in camera coordinate systems of camera modules 2A, 2B, 2C, and 2D during inspection at the time of shipment of the vehicle, for example. During the inspection, error detection part 41 obtains camera image data from camera modules 2A, 2B, 2C, and 2D when the automobile is parked at a prescribed position on the road surface where prescribed white lines are drawn, and images of the white lines are captured from the parking position. Then, error detection part 41 compares the respective camera image data obtained with a template image which should be captured when camera modules 2A, 2B, 2C, and 2D are free of installation errors.

Then, if the white lines that extend in the vertical direction in the images generated from the camera image data deviate from the white lines that extend in the vertical direction in the template image, then the installation positions of camera modules 2A, 2B, 2C, and 2D have shifted in the horizontal direction; and the amount of the shift is computed as an error (deg) in the yaw angle. In addition, if the white lines that extend in the horizontal direction in the images generated from the camera image data deviate from the white lines that extend in the horizontal direction in the image serving as the template, then the installation positions of camera modules 2A, 2B, 2C, and 2D have shifted in the vertical direction; and the amount of the shift is computed as an error (deg) in the pitch angle. Furthermore, if the camera image data deviate from the template image in the rotational direction, then the amount of the shift is computed as an error (deg) in the roll angle. Thus, the error (deg) in the yaw angle, the error (deg) in the pitch angle, and the error (deg) in the roll angle in the camera coordinate system (global coordinate system) can be detected as installation errors of camera modules 2A, 2B, 2C, and 2D.

Parameter computation part 42 computes the amount of correction (parameter) to be applied to the default address conversion tables stored in table memory part 15 when camera modules 2A, 2B, 2C, and 2D are free of errors on the basis of errors in the yaw angle, the pitch angle, and the roll angle, which are detected by error detection part 41.

At this time, parameter computation part 42 obtains the amount of horizontal shift dx (pixel), which becomes greater as the error in the yaw angle becomes greater, in order to shift the target areas to which the addresses of the camera image data should be changed in the horizontal direction in units of pixels using the address conversion tables. In addition, parameter computation part 42 obtains the amount of top-to-bottom shift dy (pixel), which becomes greater as the error in the pitch angle becomes greater, in order to shift the target areas to which the addresses of the camera image data should be changed in the vertical direction in units of pixels using the address conversion tables. The amount of the shift dx and dy (pixel) serves as a parameter to be used to correct installation errors of camera modules 2A, 2B, 2C, and 2D.

Furthermore, processing for obtaining the amount an address change target area in camera image data is rotated on the basis of an error in the roll angle (deg) will be explained. Here, a case in which a roll angle error of r (deg) is present around arbitrary coordinates (ox,oy) in a graphics coordinate system (image coordinate system) of the camera image data will be explained. In this case, rotation-related pixel loss can be minimized by setting coordinates (ox,oy) as the center coordinates of input buffer 12A, 12B, 12C, and 12D.

First, pre-rotation coordinates (sx1,sy1) which appear on the camera image due to the roll angle error before the roll angle error is corrected can be obtained using post-rotation coordinates (x1,y1) corrected on the basis of the roll angle error according to Formula 1 and Formula 2 given below.

$$sx1=(x1-ox)*\cos(-r)+(y1-oy)*\sin(-r)+ox \quad \text{(Formula 1)}$$

$$sy1=(y1-oy)*\cos(-r)+(x1-ox)*\sin(-r)+oy \quad \text{(Formula 2)}$$

Because Formulas 1 and 2 can be applied to post-rotation coordinates (x1+1,y) adjacent to post-rotation coordinates (x1,y1) in the x direction also, pre-rotation coordinates (sx2, sy2) adjacent to pre-rotation coordinates (sx1,sy1) in the x direction can be expressed as follows.

$$sx2=(x1+1-ox)*\cos(-r)+(y1-oy)*\sin(-r)+ox \quad \text{(Formula 3)}$$

$$sy2=(y1-oy)*\cos(-r)+(x1+1-ox)*\sin(-r)+oy \quad \text{(Formula 4)}$$

Here, when dxx=sx2−sx1 and dyx=sy2−sy1 are applied, dxx and dyx become as follows using Formulas 1 and 2 and Formulas 3 and 4.

$$dxx=sx2-sx1=\cos(-r) \quad \text{(Formula 5)}$$

$$dyx=sy2-sy1=\sin(-r) \quad \text{(Formula 6)}$$

Then, the post-rotation coordinates of adjacent coordinates (x1+n,y1) in the x direction can be expressed as follows using sx1, sy1, dxx, and dyx.

$$sx=sx1+dxx*n \quad \text{(Formula 7)}$$

$$sy=sy1+dyx*n \quad \text{(Formula 8)}$$

Therefore, it is clear that post-rotation coordinates of coordinates (x1+n,y1) can be computed by adding dxy, dyy to sx1, sy1, respectively. Here, because Formulas 7 and 8 include trigonometric functions like Formulas 5 and 6, they show a rotation amount (deg) which includes a decimal value.

Next, similarly to the case given above, coordinates (x1, y1+1) adjacent to post-rotation coordinates (x1,y1) in the y direction can be expressed as follows.

$$sx3=(x1-ox)*\cos(-r)+(y1+1-oy)*\sin(-r)+ox \quad \text{(Formula 9)}$$

$$sy3=(y1+1-oy)*\cos(-r)-(x1-ox)*\sin(-r)+oy \quad \text{(Formula 10)}$$

Here, when dxy=sx3-sx1 and dyy=sy3-sy1 are applied, dxy, dyy become as follows using Formula 9 and Formula 10.

$$dxx=sx3-sx1=\sin(-r) \quad \text{(Formula 11)}$$

$$dyx=sy3-sy1=\cos(-r) \quad \text{(Formula 12)}$$

Thus, post-rotation coordinates of adjoining coordinates (x1,y1+n) in the y direction can be computed by adding dxy, dyy to sx1, sy1, respectively. In addition, the post-rotation coordinates obtained in the manner show a rotation amount (deg) which includes a decimal value.

Based on the foregoing, the post-rotation coordinates are computed only once for the upper left coordinates in the graphic coordinate system as the coordinate system for the camera image data stored in input buffer 12A, 12B, 12C, and 12D; and the pixels in the remaining camera image data are rotated through additions.

Here, because the values of cos(-r) and sin(-r) in the computations are shared, the 2 values are obtained only once, and rotation amount (deg) is obtained using the result. Thus, once the correspondence between the paired pre-rotation coordinates and the post-rotation coordinates from the post-rotation coordinates is stored, the rotation amount (deg) as a parameter for correcting the roll angle error can be obtained without requiring any trigonometric computation.

Table reconfiguration part 43 reconfigures the default address conversion table stored in table memory part 15 using horizontal shift amount dx for correcting the yaw angle error, vertical shift amount dy for correcting the pitch angle error, and rotation amount (deg) for correcting the roll angle error obtained by parameter computation part 42 in order to generate a new address conversion table. First, the table reconfiguration part 43 shifts the target address conversion area by only horizontal shift amount dx, and shifts the target address conversion area by only vertical shift amount dy. Table reconfiguration part 43 then rotates the target address conversion area, which has been shifted by horizontal shift amount dx and vertical shift amount dy, by the number of pixels which corresponds to the amount of rotation.

That is, table reconfiguration part 43 rotates the target address conversion area after the target address conversion area has been shifted in the horizontal and vertical directions. The reason that the target address conversion area is rotated after it is shifted in the horizontal and vertical directions is that while the read address in input buffer 12A, 12B, 12C, and 12D as the target address conversion area are real values, the rotation amount (deg) includes a decimal value, so that a round-off error occurs in the post-rotation target address conversion area with respect to the rotation amount (deg). Therefore, table reconfiguration part 43 shifts it in the horizontal and vertical directions to avoid a round-off error before rotating it. If, on the other hand, the target address conversion area is shifted in the vertical and horizontal directions after it is rotated, the shift amount (pixel) will be divided between a cos element and a sin element, which are included in the previous rotation amount, and the shift amount (pixel) obtained by parameter computation part 42 and the actual shift amount (pixel) will have different values.

Furthermore, although the amount of rotation of the target address conversion area is computed to reconfigure or calibrate the address conversion table in order to suppress roll angle errors in the present embodiment, the yaw and pitch angle errors can be corrected merely by shifting the target address conversion area vertically and horizontally even without suppressing the roll angle error. Thus, if the input address in the horizontal direction is designated defAddr, where it is assumed that the output address is Addr, the number of pixels in the vertical direction in input buffer 12 is Xi, and camera module 2 is free of installation errors, then the reconfiguration of the address conversion table using vertical shift amount dy and horizontal shift amount dx can be simply expressed by the following equation.

$$Addr=(defAddr+dx)+Xi \cdot dy \quad \text{(Formula 13)}$$

Then, table reconfiguration part 43 shifts the target address conversion area so as to reconfigure or calibrate the address conversion table, in which the input addresses to be retrieved as the target address conversion area out of input buffers 12A, 12B, 12C, and 12D are changed, and stores it in table memory part 15.

Figure 5:
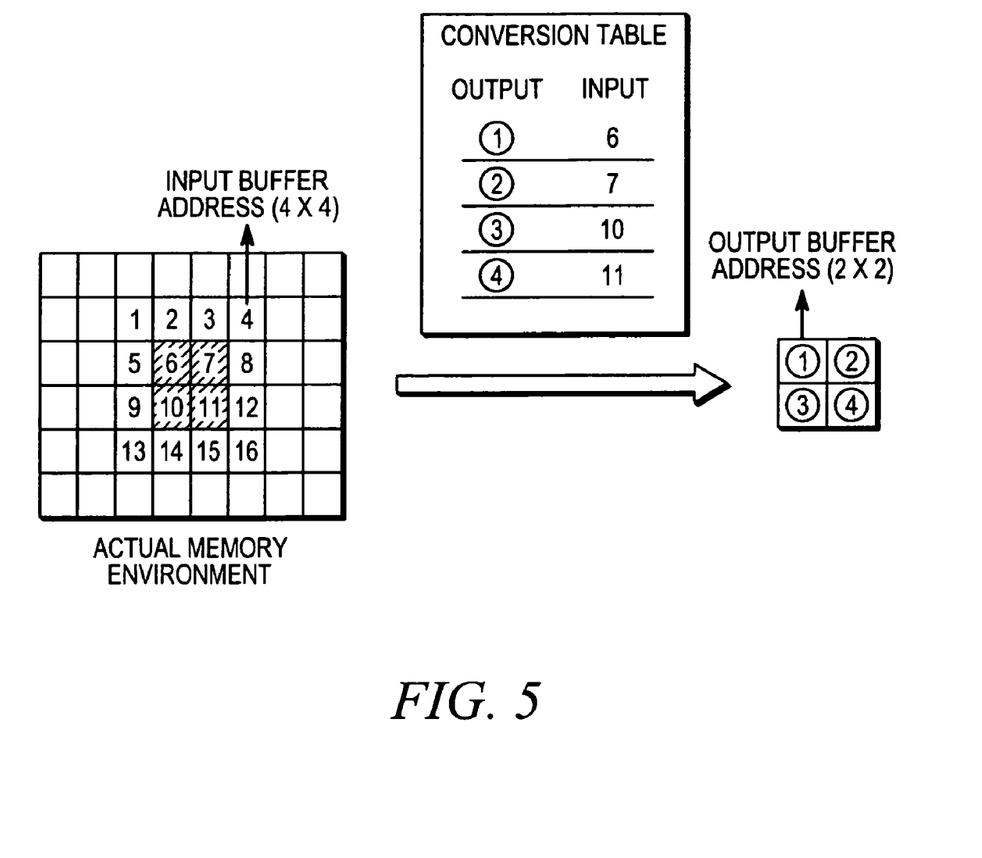
FIG. 5 is a diagram illustrating panoramic image generation processing utilizing an address conversion table when there are no camera module installation errors.

As shown in FIG. 5, the address conversion table reconfiguration processing is applied to the default address conversion table under the condition that camera modules 2A, 2B, 2C, and 2D are free of installation errors. In this address conversion table, the target address conversion area out of the input addresses of input buffer 12 which corresponds to arbitrary camera module 2 represents four-by-four image from input addresses "1" through "16" in actual memory. In addition, the default address conversion table shows that the camera image data are retrieved from input addresses "6," "7," "10," and "11" from input addresses "1" through "16," the camera image data from input address "6" are stored in output address "1" of output buffer 16, the camera image data from input address "7" are stored in output address "2" of output buffer 16, the camera image data from input address "10" are stored in output address "3" of output buffer 16, and the camera image data from input address "11" are stored in output address "4" of output buffer 16.

As a result, camera image data captured by camera module 2 at a specific location around the vehicle can be stored in output buffer 16 and displayed on monitor 3.

Figure 6:
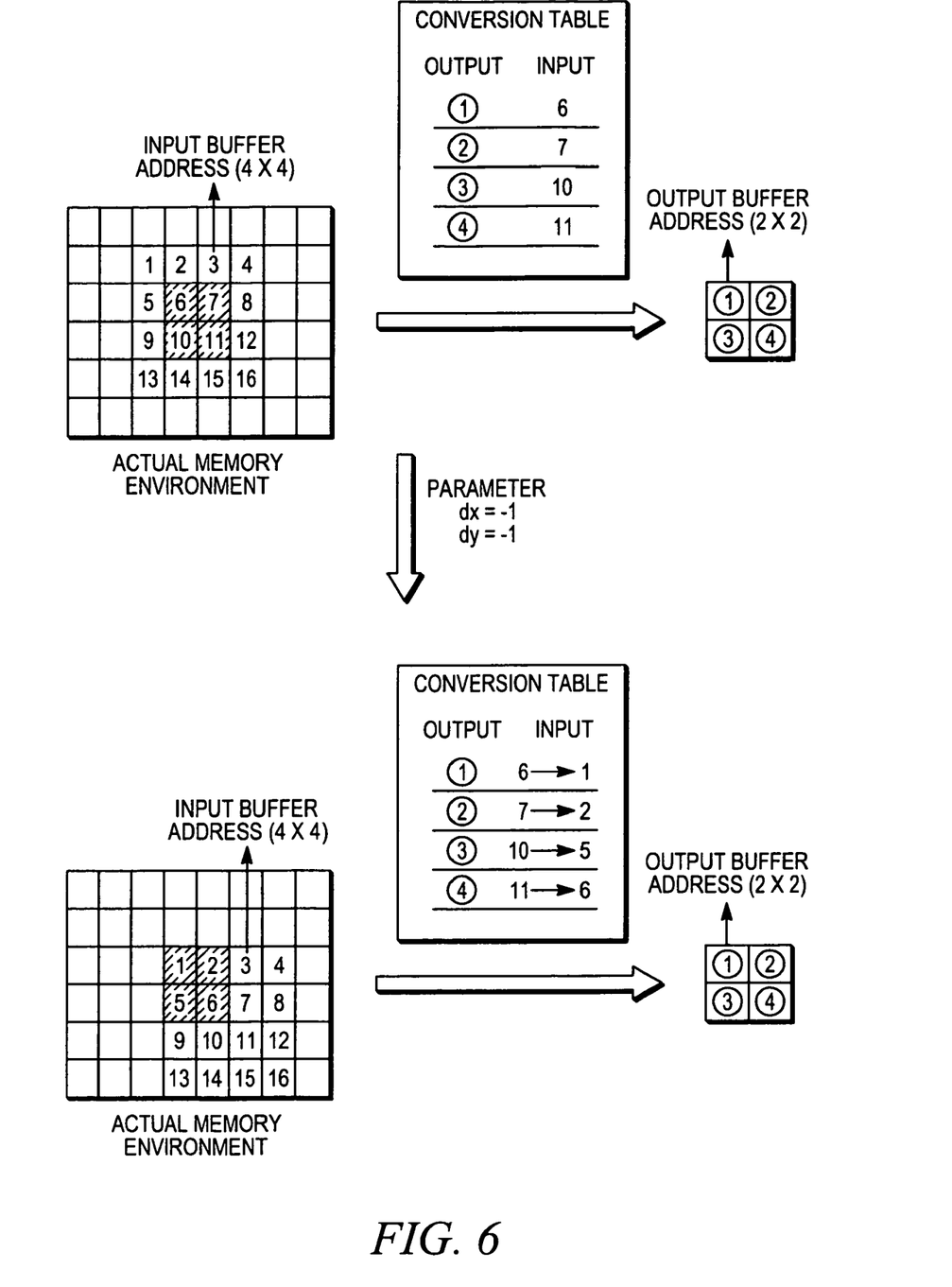
FIG. 6 is a diagram illustrating panoramic image generation processing utilizing an address conversion table when a camera module contains installation errors.

On the other hand, because errors are present in the camera image data pickup range when camera modules 2A, 2B, 2C, or 2D contain installation errors, the camera image data which are supposed to be stored in input buffer 12 at input addresses "6," "7," "10," and "11" shown in FIG. 5 will be shifted and stored in input addresses "1," "2," "5," and "6" as shown in FIG. 6(a). Then, when the camera image data in input addresses "6," "7," "10," and "11" are retrieved in the same manner as described above and stored in output addresses "1" through "4," an image of a location which is different from the specific location around the vehicle which is supposed to be displayed will be displayed.

However, as described above, when -1 (equivalent to 1 address) is used for vertical shift amount dy, and -1 (equivalent to 1 address) is used for horizontal shift amount dx so as to shift the target address conversion area when reconfiguring or calibrating the address conversion table, changes can be made so as to retrieve input addresses "1," "2," "5," and "6" as shown in FIG. 6(b).

Figure 7:
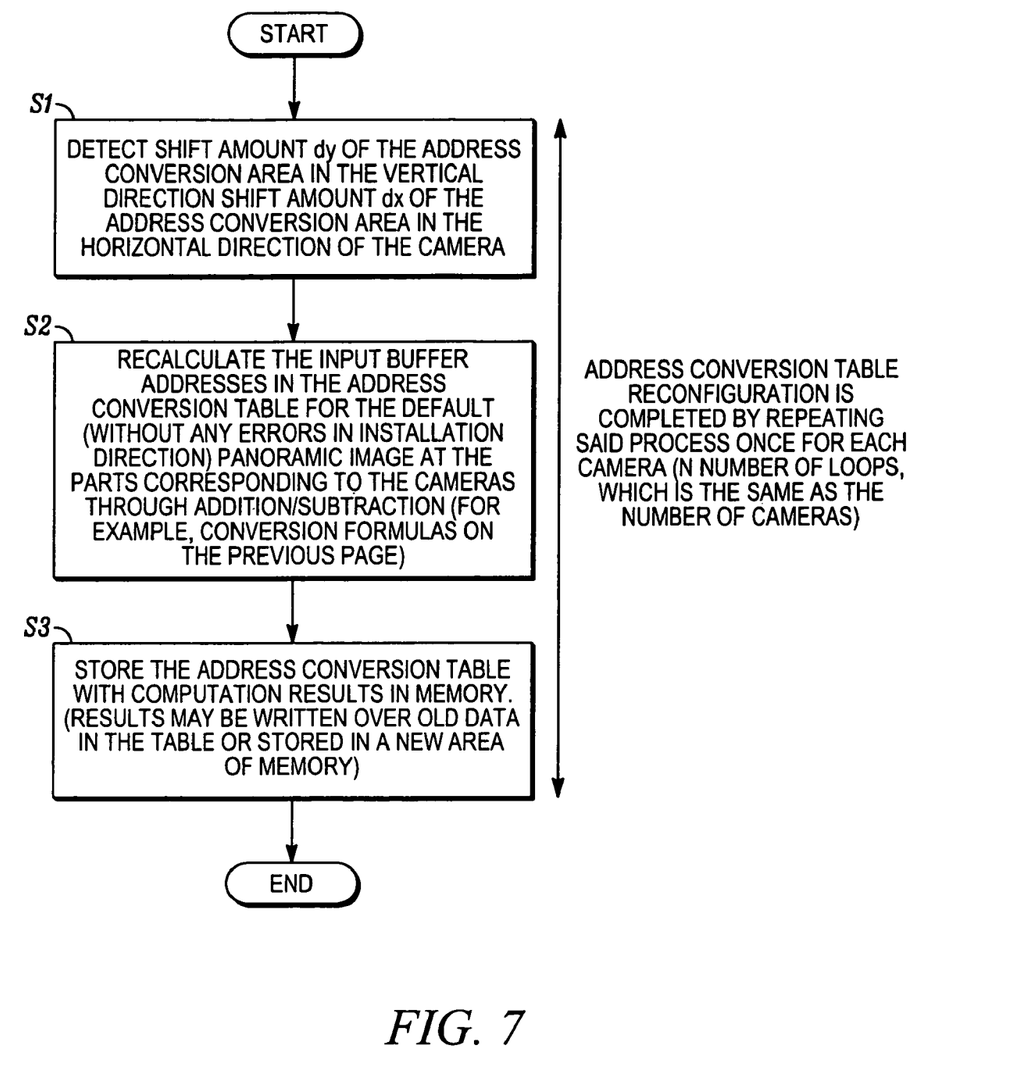
FIG. 7 is a flow chart illustrating the procedure for address conversion table reconfiguration processing.

When multiple camera modules 2 are connected to vehicle image processor 1 as described above, this address conversion table reconfiguration processing is realized by repeating the processes of Steps SI through Step S3 shown in FIG. 7 once for each camera module 2.

That is, in Step S1, error detection part 41 first obtains yaw angle error (deg), pitch angle error (deg), and roll angle error (deg) of given camera module 2; and parameter computation part 42 obtains vertical shift amount dy (pixel) and horizontal shift amount dx (pixel) from respective errors (deg).

Next, in Step S2, the input addresses where camera image data captured by given camera module 2 are stored are incremented/decremented by vertical shift amount dy and horizontal shift amount dx in the address conversion table used to generate the default panoramic image, and the entire input addresses (entire address change target area) of the address conversion table are then rotated by the rotation amount based on roll angle error (deg).

Next, in Step S3, the address conversion table reconfigured in Step S2 is stored in table memory part 15. Here, the reconfigured address conversion table may be stored in table memory part 15 in a memory area different from that for the default address conversion table, or the reconfigured address conversion table may be written over the default address conversion table.

Thus, the correction amounts (pixel) and the rotation amounts of the respective address conversion tables are obtained from installation errors (deg) of respective camera modules 2, whereby errors in the global coordinate system (camera coordinate system) can be corrected through addition, subtraction, and rotation in units of pixels in the graphics coordinate system.

Although the address conversion table reconfiguration process explained with reference to FIG. 7 was explained using a case in which Step SI through Step S3 were repeated once for each camera module 2 in order to reconfigure or calibrate the default address conversion tables for respective camera modules 2, the reconfiguration process is not limited to this case. Alternatively, the process in Step SI may be repeated once for each camera module 2 so as to obtain vertical shift amount dy, horizontal shift amount dx, and rotation amount (deg) for each camera module, and all of the address conversion tables may be reconfigured and stored in table memory part 15 in Step S2 and Step S3.

As described in detail above, according to vehicle image processor 1 of the embodiment, even when the camera image data at the input addresses designated by the address conversion tables are retrieved from the camera image data stored in input buffers 12 with reference to the address conversion tables stored in table memory part 15 and stored at the output addresses designated by the address conversion tables, panoramic image 30 can be displayed on monitor 3 while suppressing deviations and distortions among the constituent images due to installation errors of camera modules 2.

Figure 8:
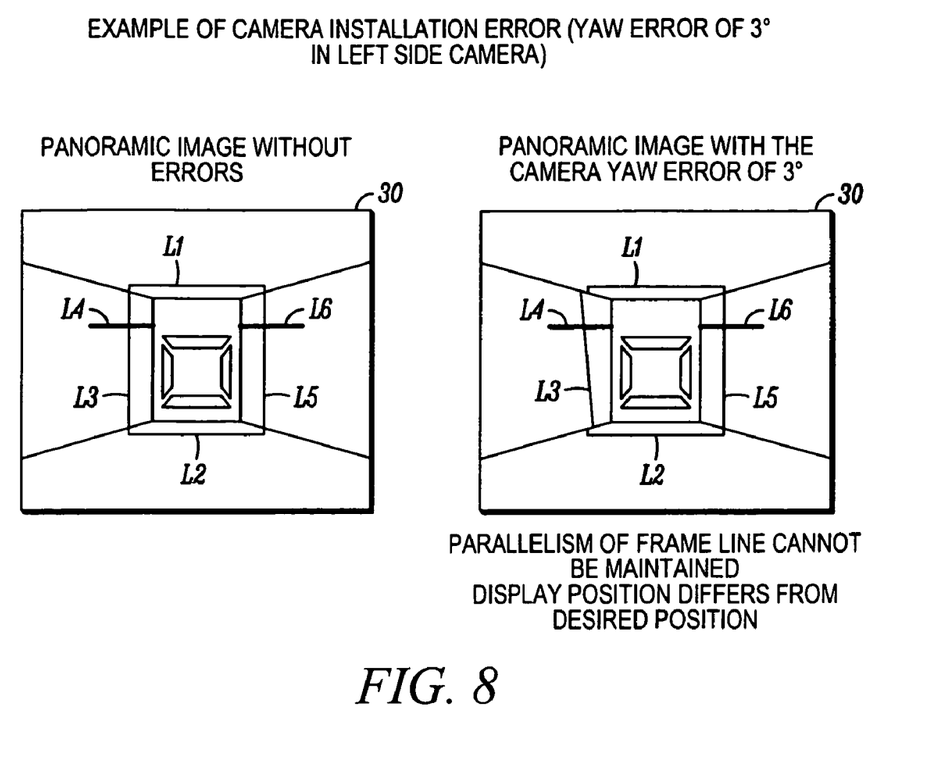
FIG. 8 is a diagram illustrating a panoramic image displayed when a yaw angle error occurs.

That is, according to the vehicle image processor 1, as shown in FIG. 8, even when the image shown in FIG. 8(a) is to be displayed as the desired panoramic image while the installation position or the direction of camera module 2, which is directed to capture an image on the left side of the vehicle, contains errors, distortions of white lines L3 and L4 and deviation of white line L3 at the part where adjoining front image and rear image are joined together, as shown in FIG. 8(b), can be suppressed. More specifically, although the degree of parallelism of white line L3 cannot be maintained when camera module 2 contains a 3° (deg) yaw angle installation error (FIG. 8(b)), a panoramic image that is closer to panoramic image 30 shown in FIG. 8(a) than to panoramic image 30 shown in FIG. 8(b) that contains distortion and deviation can be obtained simply by shifting the input addresses in its address conversion table in the horizontal direction. More specifically, even when side cameras of the vehicle contain a yaw angle error of 3°, that is, 23 pixels on the image or approximately 30 cm in reality, a deviation of 23/4801 (pixel) in terms of VGA monitor 3 (Y axis) can be suppressed to 1/480.

In addition, according to vehicle image processor 1, because the camera image data are stored in the output buffer according to the address conversion tables, which are obtained by reconfiguring or calibrating the address conversion tables used to generate panoramic image 30 when camera modules 2 are free of vehicle attachment errors using the parameters for correcting vehicle attachment errors of camera modules 2, panoramic image 30 can be generated from multiple camera image data through simple processing without requiring many processing steps when actually generating panoramic image 30 simply by shifting the input addresses in the address conversion tables. In addition, because the address conversion tables are reconfigured on the basis of installation errors of camera modules 2 peculiar to a given vehicle, the required memory capacity of table memory part 15 for storing the address conversion tables never becomes very large.

More specifically, panoramic image 30, for which distortions and deviations are suppressed regardless of installation errors of camera modules 2, can be displayed simply through the processing during which the camera numbers for designating input buffers 12 that correspond to camera modules 2 and the address conversion tables that indicate the correspondence between the input addresses for designating the input addresses from which the camera image data for generating panoramic image 30 are retrieved and the output addresses for storing the camera image data retrieved from the input addresses are stored in table memory part 15 for the respective camera modules, the camera image data are retrieved from input buffers 12 by image conversion part 14 according to the camera number and the input addresses designated by the address conversion tables, and the camera image data are stored at the output addresses designated by the address conversion tables.

In addition, because the vehicle image processor 1 is equipped with error detection part 41, parameter computation part 42, and table reconfiguration part 43 shown in FIG. 2, the address conversion tables for correcting errors in the image coordinate system which are attributable to errors in the camera coordinate system can be reconfigured. That is, panoramic image 30, for which an error in the yaw angle of the camera coordinate system as a parameter for correcting vehicle installation errors of a vehicle's camera module 2 is suppressed, can be displayed simply by shifting the input addresses in the horizontal direction in the image coordinate system. In addition, panoramic image 30, for which an error in the pitch angle of the camera coordinate system as a parameter for correcting vehicle installation errors of a vehicle's camera module 2 is suppressed, can be displayed simply by shifting the input addresses in the vertical direction in the image coordinate system. Furthermore, panoramic image 30, for which an error in the roll angle of the camera coordinate system as a parameter for correcting vehicle installation errors of a vehicle's camera module 2 is suppressed, can be displayed simply by shifting the input addresses in the rotational direction in the image coordinate system.

Furthermore, according to the vehicle image processor 1, deviation and distortion in panoramic image 30 can be further suppressed by suppressing errors in the yaw angle and the pitch angle simultaneously.

Moreover, according to the vehicle image processor 1 of the embodiment when panoramic image 30, in which not only errors in the yaw angle and pitch angle but also an error in the roll angle are suppressed, is to be displayed, the address conversion tables may be reconfigured in such a manner that an error in the yaw angle or an error in the pitch angle is suppressed before the error in the roll angle, and the error in the roll angle is then suppressed. As a result, even when a computation result of rotation amount (deg) contains a decimal value due to the presence of an error (deg) in the roll angle, the influence of round-off error created by the decimal value can be minimized.

In other words, address conversion tables for having a right side image and a left side image displayed on a single screen on monitor 3 and address conversion tables for having a right rear image and a left rear image displayed on a single screen, for example, may also be stored table memory part 15. Even when multiple camera image data are turned into 1 continuous image using the address conversion tables, inter-image deviation and distortion in the display image can be suppressed when the address conversion tables are reconfigured by correcting the pitch angle, the yaw angle, and the roll angle on the basis of installation errors of camera modules 2 in the manner.

This application is based on Japanese Patent Application No. 2005-058692, filed Mar. 3, 2005, in the Japanese Patent Office, the entire contents of which are hereby incorporated by reference.

Also, the above-described embodiments have been described in order to allow easy understanding of the present invention, and do not limit the present invention. On the contrary, the invention is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. An image processor for a vehicle having a plurality of cameras and a monitor that displays a panoramic image derived from multiple images generated by the plurality of cameras, the image processor comprising:
   input buffers adapted to receive and store camera image data generated by the plurality of cameras;
   an output buffer adapted to store panoramic image data for display on the monitor;
   a default address conversion table that describes a default correspondence between memory addresses of camera images from an arrangement of cameras assumed to be free of installation errors and memory addresses of a panoramic image generated using the camera images;
   a controller adapted to:
      detect installation errors in the plurality of cameras based on deviations between a template image and a respective camera image obtained while the vehicle is stationary and at a prescribed position, the template image representing the prescribed position and generated assuming the plurality of cameras are free of installation errors;
      prepare a reconfigured address conversion table from the default address conversion table that describes a calibrated correspondence between memory addresses of the respective camera image and memory addresses of a panoramic image generated using the respective camera image to correct for the installation errors;
      read the camera image data stored on the input buffers;
      translate the camera image data into the panoramic image data using the reconfigured address conversion table; and
      store the panoramic image data on the output buffer.

2. The image processor of claim 1, wherein:
   the reconfigured address conversion table includes one or more numbers each assigned to a particular camera to designate input data contained in a specified input buffer as having been generated by that particular camera.

3. The image processor of claim 1, wherein the input buffers are part of a single memory unit.

4. The image processor of claim 1, wherein:
   the reconfigured address conversion table includes input address information that associates each of a plurality of input addresses in the input buffers with a corresponding output memory address in the output buffer to form at least a portion of the panoramic image; and
   the controller is further adapted to read the camera image data located at each of the plurality of input addresses and to store the camera image data so read at the corresponding output memory address in accordance with the input address information.

5. The image processor of claim 4, wherein:
   the controller further comprises a table reconfiguration module that corrects the installation errors in the plurality of cameras in the reconfigured address conversion table by shifting the input addresses of the default address conversion table and storing the shifted input address information in the reconfigured address conversion table.

6. The image processor of claim 5, wherein the table reconfiguration module corrects a yaw error in the installation of one of the plurality of cameras in the reconfigured address conversion table by shifting at least one of the plurality of input addresses of the default address conversion table in a direction corresponding to a horizontal direction in an image coordinate system represented by the camera image data generated by the one of the plurality of cameras.

7. The image processor of claim 5, wherein the table reconfiguration module corrects a pitch error in the installation of one of the plurality of cameras in the reconfigured address conversion table by shifting at least one of the plurality of input addresses of the default address conversion table in a direction corresponding to a vertical direction in an image coordinate system represented by the camera image data generated by the one of the plurality of cameras.

8. The image processor of claim 5, wherein the table reconfiguration module corrects a roll error in the installation of one of the plurality of cameras in the reconfigured address conversion table by shifting at least one of the plurality of input addresses of the default address conversion table in a direction corresponding to a rotational direction in an image coordinate system represented by the camera image data generated by the one of the plurality of cameras.

9. The image processor of claim 5, wherein the table reconfiguration module corrects a yaw error in the installation of one of the plurality of cameras in the reconfigured address conversion table by shifting at least one of the plurality of input addresses of the default address conversion table in a direction corresponding to a horizontal direction in an image coordinate system represented by the camera image data generated by the one of the plurality of cameras, and corrects a pitch error in the installation of the one of the plurality of cameras in the reconfigured address conversion table by shifting at least one of the plurality of input addresses of the default address conversion table in a direction corresponding to a vertical direction in the image coordinate system.

10. The image processor of claim 5, wherein the table reconfiguration module first corrects a yaw error in the installation of one of the plurality of cameras in the reconfigured address conversion table by shifting at least one of the plurality of input addresses of the default address conversion table in a direction corresponding to a horizontal direction in an image coordinate system represented by the camera image data generated by the one of the plurality of cameras, and corrects a pitch error in the installation of the one of the plurality of cameras in the reconfigured address conversion table by shifting at least one of the plurality of input addresses of the default address conversion table in a direction corresponding to a vertical direction in the image coordinate system; and then corrects a roll error in the installation of the one of the plurality of cameras in the reconfigured address conversion table by shifting at least one of the plurality of input addresses of the default address conversion table in a direction corresponding to a rotational direction in the image coordinate system.

11. An image processor for a vehicle having a plurality of cameras and a monitor that displays a panoramic image generated from multiple images generated by the plurality of cameras, the image processor comprising:
    input buffer means for storing camera image data captured by the cameras;
    output buffer means for storing panoramic image data generated from the camera image data retrieved from the input buffer means and for outputting the panoramic image data to the monitor;
    a default address conversion table that describes a first correspondence from input memory addresses of camera images from an arrangement of cameras assumed to be free of installation errors to corresponding output memory addresses of a panoramic image generated using the camera images;
    means for detecting installation errors in the cameras based on deviations between a template image and a respective camera image obtained when the vehicle is stationary and at a prescribed position, the template image representing the prescribed position and generated assuming the cameras are free of installation errors;
    means for preparing a reconfigured address conversion table that describes a second correspondence from input memory addresses of the respective camera image and output memory addresses of a panoramic image generated using the respective camera image to correct for the installation errors; and
    means for retrieving the camera image data from the input buffer means and storing the camera image data in the output buffer means according to the reconfigured address conversion table means-to generate the panoramic image data.

12. The image processor of claim 11, wherein:
    the reconfigured address conversion table includes one or more camera numbers each assigned to a particular camera to designate input data contained in a specified input buffer as having been generated by that particular camera; and the reconfigured address conversion table includes input address information for designating input addresses needed for retrieving the camera image data for generating the panoramic image data from the input buffers and output address information for designating output addresses in the output buffer means that contain the camera image data retrieved from the input addresses; and
    the retrieving means comprises means for retrieving the camera image data from the input buffers according to the camera numbers and the input address information designated by the reconfigured address conversion table and storing the camera image data in output addresses in the output buffer means according to the output address information designated by the reconfigured address conversion tables.

13. The vehicle image processor of claim 11, wherein the means for preparing the reconfigured address conversion table comprises:
    table reconfiguration means for shifting the input addresses of the default address conversion table to correct installation errors of the cameras on the vehicle in order to generate the reconfigured address conversion table.

14. The vehicle image processor of claim 13, wherein the table reconfiguration means corrects for a yaw error in the installation of one of the plurality of cameras in the reconfigured address conversion table by shifting at least one of the plurality of input addresses of the default address conversion table in a direction corresponding to a horizontal direction in an image coordinate system represented by the camera image data generated by the one of the plurality of cameras.

15. The vehicle image processor of claim 13, wherein the table reconfiguration means corrects a pitch error in the installation of one of the plurality of cameras in the reconfigured address conversion table by shifting at least one of the plurality of input addresses of the default address conversion table in a direction corresponding to a vertical direction in an image coordinate system represented by the camera image data generated by the one of the plurality of cameras.

16. The image processor of claim 13, wherein the table reconfiguration means corrects a roll error in the installation of one of the plurality of cameras in the reconfigured address conversion table by shifting at least one of the plurality of input addresses of the default address conversion table in a direction corresponding to a rotational direction in an image coordinate system represented by the camera image data generated by the one of the plurality of cameras.

17. The vehicle image processor of claim 13, wherein the table reconfiguration means corrects a yaw error in the installation of one of the plurality of cameras in the reconfigured address conversion table by shifting at least one of the plurality of input addresses of the default address conversion table in a direction corresponding to a horizontal direction in an image coordinate system represented by the camera image data generated by the one of the plurality of cameras, and corrects a pitch error in the installation of the one of the plurality of cameras in the reconfigured address conversion table by shifting at least one of the plurality of input addresses of the default address conversion table in a direction corresponding to a vertical direction in the image coordinate system.

18. The vehicle image processor of claim 13, wherein the table reconfiguration means first corrects a yaw error in the installation of one of the plurality of cameras in the reconfigured address conversion table by shifting at least one of the plurality of input addresses of the default address conversion table in a direction corresponding to a horizontal direction in an image coordinate system represented by the camera image data generated by the one of the plurality of cameras, and corrects a pitch error in the installation of the one of the plurality of cameras in the reconfigured address conversion table by shifting at least one of the plurality of input addresses of the default address conversion table in a direction corresponding to a vertical direction in the image coordinate system; and then after the yaw error and pitch error are corrected, corrects a roll error in the installation of one of the plurality of cameras in the reconfigured address conversion table by shifting at least one of the plurality of input addresses of the default address conversion table in a direction corresponding to a rotational direction in an image coordinate system represented by the camera image data generated by the one of the plurality of cameras.

19. An image processing method for use in a vehicle having a plurality of cameras and a monitor that displays a panoramic image derived from multiple images generated by the plurality of cameras, comprising:
storing camera image data captured by the cameras on an input buffer;
storing panoramic image data generated from the camera image data retrieved from the input buffer for output to the monitor as a panoramic image display;
determining the existence of an installation error in at least one of the plurality of cameras based on deviations between a template image and a respective camera image in the input buffer obtained while the vehicle is stationary and at a prescribed position, the template image representing the prescribed position and generated assuming the plurality of cameras are free of installation errors;
determining the correction parameter to be applied to a default address conversion table to correct the installation error, the default address conversion table associating a plurality of input addresses of camera images from an arrangement of cameras assumed to be free of installation errors with corresponding output memory addresses of a panoramic image generated using the camera images;
reconfiguring the default address conversion table by shifting memory addresses in the input buffer in accordance with the correction parameter to generate a reconfigured address conversion table; and
retrieving the camera image data from the input buffer and storing the camera image data in the output buffer according to the reconfigured address conversion table to generate the panoramic image data for output to the monitor as the panoramic image display.

20. The image processing method of claim 19, wherein reconfiguring the default address conversion table comprises:
correcting for a yaw error in the installation of the at least one of the plurality of cameras in the reconfigured address conversion table by shifting the memory addresses in the input buffer of the default address conversion table in a direction corresponding to a horizontal direction in an image coordinate system represented by the camera image data generated by the at least one of the plurality of cameras.

21. The image processing method of claim 19, wherein reconfiguring the default address conversion table comprises:
correcting for a pitch error in the installation of the at least one of the plurality of cameras in the reconfigured address conversion table by shifting the memory addresses in the input buffer of the default address conversion table in a direction corresponding to a vertical direction in an image coordinate system represented by the camera image data generated by the at least one of the plurality of cameras.

22. The image processing method of claim 19, wherein reconfiguring the default address conversion table comprises:
correcting for a roll error in the installation of the at least one of the plurality of cameras in the reconfigured address conversion table by shifting the memory addresses in the input buffer of the default address conversion table in a direction corresponding to a rotational direction in an image coordinate system represented by the camera image data generated by the at least one of the plurality of cameras.

23. The image processing method of claim 19, wherein reconfiguring the default address conversion table comprises:
correcting for a yaw error in the installation of the at least one of the plurality of cameras in the reconfigured address conversion table by shifting the memory addresses in the input buffer of default address conversion table in a direction corresponding to a horizontal direction in an image coordinate system represented by the camera image data generated by the at least one of the plurality of cameras; and
correcting for a pitch error in the installation of the at least one of the plurality of cameras in the reconfigured address conversion table by shifting the memory addresses in the input buffer of the default address conversion table in a direction corresponding to a vertical direction in the image coordinate system represented by the camera image data generated by the at least one of the plurality of cameras.

24. The image processing method of claim 19, wherein reconfiguring the default address conversion table comprises:
correcting for a yaw error in the installation of the at least one of the plurality of cameras in the reconfigured address conversion table by shifting the memory addresses in the input buffer of the default address conversion table in a direction corresponding to a horizontal direction in an image coordinate system represented by the camera image data generated by the at least one of the plurality of cameras; and
after correcting for the yaw error, correcting for a pitch error in the installation of the at least one of the plurality of cameras in the reconfigured address conversion table by shifting the memory addresses in the input buffer of the default address conversion table in a direction corresponding to a vertical direction in the image coordinate system represented by the camera image data generated by the at least one of the plurality of cameras; and
after correcting for the yaw and pitch errors, correcting for a roll error in the installation of the at least one of the plurality of cameras in the reconfigured address conversion table by shifting the memory addresses in the input buffer of the default address conversion table in a direction corresponding to a rotational direction in the image coordinate system represented by the camera image data generated by the at least one of the plurality of cameras.

25. A method for calibrating an vehicle image processor that incorporates camera image data generated by multiple vehicle-mounted cameras and stored on an input buffer into a panoramic image stored on an output buffer for display on a monitor, comprising:
detecting at least one error in the installation of at least one of the multiple vehicle-mounted cameras based on deviations between a template image and a respective camera image obtained while the vehicle is stationary and at a prescribed position, the template image representing the prescribed position and generated assuming the plurality of cameras are free of installation errors;
creating a reconfigured address conversion table by changing a default address conversion table so that it describes a calibrated association between a different input address in the input buffer with the target output address in the output buffer, the different input address being offset from the selected input address in a direction opposing the at least one detected error in the installation of the at least one vehicle-mounted camera, the default address conversion table describing a default association between at least one selected input address in the input buffer with an output address in the output buffer to create at least a portion of a panoramic image generated using data obtained from the at least one select input address and the default association based on an arrangement of cameras assumed to be free of installation errors; and loading the reconfigured address conversion table into a memory accessible by the vehicle image processor in a manner that permits the vehicle image processor to retrieve camera image data stored at the different input address and store the retrieved camera image data in the target output address of the output buffer.

* * * * *